Dec. 22, 1964          C. E. J. PECKNOLD          3,162,504
                  GRAPHIC RECORDING APPARATUS
                       Filed Dec. 1, 1961
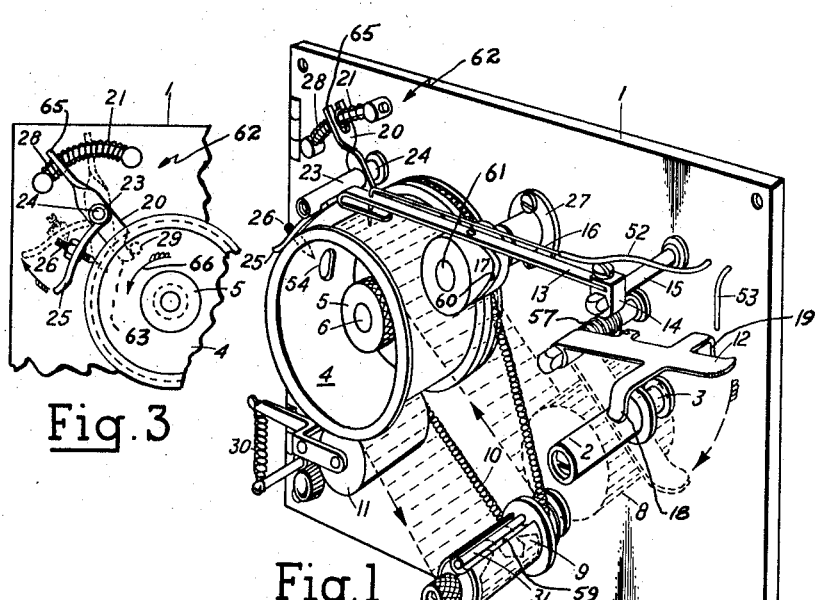
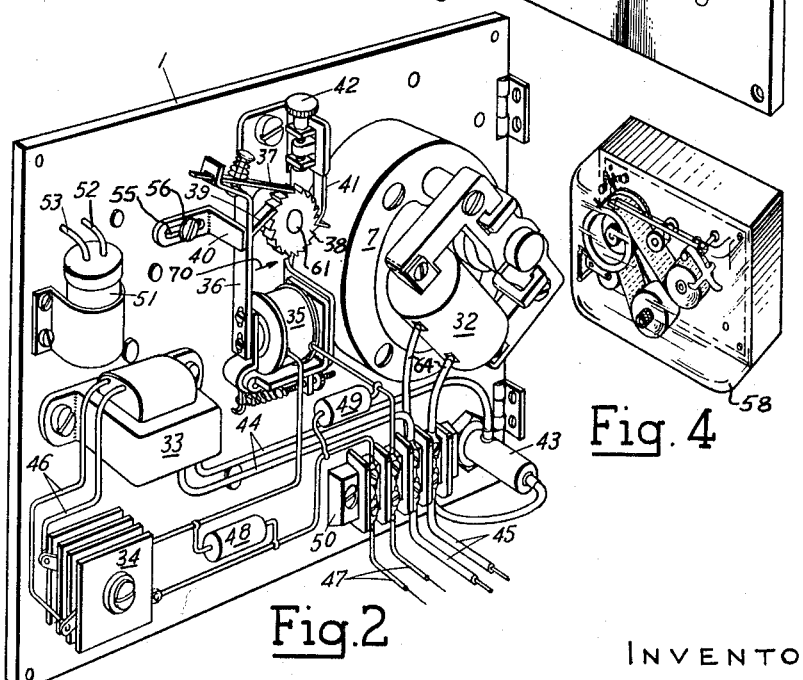
INVENTOR
CECIL E. J. PECKNOLD
BY: Fetherstonhaugh & Co.
                ATTORNEY 3,162,504
GRAPHIC RECORDING APPARATUS
Cecil E. J. Peckmold, Vancouver, British Columbia, Canada, assignor to Greater Vancouver Sewerage and Drainage District, Vancouver, British Columbia, Canada, a body corporate of British Columbia
Filed Dec. 1, 1961, Ser. No. 156,247
9 Claims. (Cl. 346—23)

This invention relates to graphic recording apparatus, and particularly to electrically actuated rainfall recorders.

Graphic recording instruments for making a visible record of physical data, by means of an ink trace or the like, are known in the art. Instruments for recording such physical data as the quantity, intensity and duration of rainfall, for example, are electrically actuated by means of a switch which is closed by a tipping bucket in a remotely-located rain receiver or rain gauge. The tipping bucket in such devices tips after a certain predetermined quantity of water, for example, the quantity of water corresponding to $\frac{1}{100}$ of an inch of rainfall, is collected by the bucket. Rainfall intensity records, to be of any value in the design of facilities for water conservation, regulation, flood control and drainage, must be continuous unbroken records over long periods of time. Accurate, complete and unbroken records are extremely important. Heretofore, graphic recorders made for this purpose have not been constructed so as to permit long-time use without continual human intervention for the purpose or replacing ink and paper charts, and for indicating reference times. Some of the previous instruments have provided visible records which are difficult to read because of the inadequacy of the scribing mechanism. The remote location of some rainfall measurement devices has made the use of known recorders particularly inconvenient because of the fact that they cannot run automatically for long periods without the benefit of human attention.

The most irksome features of previous recorders have been the necessity of changing the charts at specific times and the robot regularity of attendance they demand; the lack of clarity of the recorded information and the inaccuracies resulting therefrom; and the relatively large size of the recorders occupying valuable floor space that could otherwise be used to better advantage.

It is therefore an object of the present invention to provide graphic recording apparatus for the measurement of physical data such as quantity, intensity and duration of rainfall, which can operate without the necessity of human attention over long periods of time.

It is a further object of the present invention to provide graphic recording apparatus which automatically produces time reference marks on the graphic record without the necessity of human attention.

Another object is to provide graphic recording apparatus which can be connected to measuring devices in remote areas and which can record physical data obtained from such remote devices without the necessity of human attention, over long periods of time.

Further specific features of the present apparatus are the use of a long, continuous tape constantly moved by a traction drum; a recording pen designed and mounted to magnify the recording movements; means regularly indexing the tape as it progresses regardless of slippage, contraction or expansion of said tape in order to ensure the indication of exactly equal time intervals for precise recording; means for keeping the tape taut and on course; and a compact arrangement of the various components.

Accordingly, the present invention provides graphic recording apparatus for recording a signal on long paper tape and the like, comprising a tape take-off spool, tape advancing means including a rotatable traction drum to which the tape is able to adhere, the rotatable drum being adapted to receive tape from the said take-off spool, a tape take-up spool adapted to receive the tape from said tape advancing means, graphic signal recording means adapted to make a comparatively large graphic representative of an external signal on the tape, and time recording means adapted to make time reference marks on the tape at predetermined time intervals.

In a preferred embodiment of the invention, described in greater detail below, a chart tape long enough to last for a number of months is slowly passed through the graphic recording apparatus and the data is recorded on the tape by means of the transverse step-like movement of a capillary pen, which is provided with an ink supply great enough to last longer than a chart tape. In apparatus according to the invention, the step-like movements of the pin are magnified and provide legibility and ease of recognition of the recorded data. The tape record for any particular time period may be removed from the apparatus simply by cutting the tape, removing the desired portion, and reconnecting the remaining portion to the take-up spool. The recorder may be installed in remote and seldom visited locations and may be mounted in any convenient manner. A series of time reference marks are automatically made on the tape, eliminating the need for human marking of reference times, and preventing inaccurate recordings as a result of tape slippage or stretching, or the effect of different atmospheric conditions of the various elements of the recorder.

The invention will now be described with reference to the accompanying drawings, in which, FIGURE 1 is a perspective front view of a preferred embodiment of apparatus according to the invention, FIGURE 2 is a perspective rear view of a preferred embodiment of apparatus according to the invention, FIGURE 3 is an elevation view of a preferred embodiment of the time recording mechanism according to the invention; and FIGURE 4 is a front perspective view of a preferred embodiment of apparatus constructed according to the invention and enclosed within a protective cabinet.

The drawings show a convenient mounting arrangement for the several components of a preferred embodiment of graphic recording apparatus constructed according to the present invention. The components of the apparatus are mounted on both sides of a mounting base or plate 1, which usually is maintained in a vertical plane. The elements on the front side of the plate are shown in FIGURE 1, and those on the rear side appear in FIGURE 2. A roll of paper recording tape 8 (shown in broken lines in FIGURE 1) is mounted on a take-off spool or bobbin 2 which is rotatably mounted on a bearing post 3 cantilevered off plate 1. The paper tape passes from the take-off spool 2 around a traction drum 4 to the take-up spool 9. The leading end of the tape is secured temporarily to the take-up spool 9 by means of an anchoring rod 31 connected at one end to the spool 9 just above the surface of a groove 59 in and extending longitudinally of said spool. The end of the paper tape can be wound around the rod 31 and thereby secured in the manner shown in broken lines in FIGURE 1. It can be readily seen that the paper tape can be easily laterally slid off the spool 9 when it is desired to remove the tape from the recording apparatus.

The paper tape is made to advance in the direction indicated by the arrows in FIGURE 1 by means of frictional engagement with the traction drum 4. The traction drum 4 is mounted on a rotatable spindle 6 and is driven through a gear train (not shown) within the casing 7 mounted on the opposite side of plate 1, as shown in FIGURE 2. A suitable constant speed electric motor 32 drives the gear train. A threaded thumb nut 5 removably retains traction drum 4 on spindle 6.

The take-up spool 9 is driven by means of a flexible linkage or belt 10, which may conveniently be a continuous coiled spring as shown. The flexible linkage 10 is also wound around a groove in the traction drum 4, and the rotation of the traction drum causes the spool 9 to turn. The spool 9 is made to rotate at a speed sufficient to produce a circumferentially developed length or linear development greater than the traction drum 4, thereby causing the tape to remain taut while it is being wound onto the take-up spool. Slippage of the flexible linkage 10 upon the take-up spool 9 when the tape is taut, compensates for the changing diameter of the roll of tape being taken up upon the take-up spool. A spring-loaded idler roller 11 is forced by the spring 30 against the paper tape, also helping to keep the tape taut. Spring loaded tape guide and brake 12 has laterally-spaced fingers 18 and 19 that span and retain a tape roll on bobbin 2. The guide and brake 12 is positioned to direct said tape correctly onto the traction drum 4, and the pressure of the coiled spring 57 presses the brake 12 against the tape, thereby keeping the tape taut and from unwinding too quickly.

A capillary pen 16 is used to record information on the tape as the tape passes around the traction drum 4. The pen is supplied with ink through a flexible hollow tube 52 which is connected to an ink reservoir 51 on the other side of plate 1. A blow pipe 53 is used to start the ink flow when the pen has not been in use for some time.

The capillary pen 16 is attached to a long pen arm 13 which is pivotally mounted for horizontal movement on a pivot block 14 which in turn is mounted upon a bearing post 15 rotatably mounted on and projecting from plate 1. The capillary pen 16 is thus given universal movement whereby it is able to move horizontally from one side of the taper tape to the other and also vertically onto and off of the tape.

The movement of the pen arm 13 is controlled by the rotational movement of a shuttle cam 17, which is fixedly mounted on an axle 61 which is rotatable in a flanged journal 27 secured to the plate 1, said axle extending through the plate. A projecting stud (not shown) on the under side of the pen arm 13 fits into an endless groove 60, of reversible pitch, on the cam 17. Rotational movement of the cam 17 thus causes transverse movement of the pen arm 13 and therefore of the pen 16 with respect to the direction of motion of the tape. The pen point thus moves back and forth across the tape as the cam 17 is rotated. A desirable magnification of the graphic trace, for legibility, is attained by mounting the cam 17 at a point between the pivot end of the pen arm and the pen end of said arm so that the ratio of movement of the pen relative to the movement of the cam is greater than one to one.

The cam 17 is caused to rotate by means of the rotation of a ratchet wheel 38 fixed to the axle 61 on the side of plate 1 remote from the cam. The ratchet wheel 38 is caused to move by the pawl 37 which is attached to an armature 36. The armature is caused to move in the direction of the arrow 70 shown in FIGURE 2 by flow of current through the relay coil 35. A limit stop 39, integral with the armature 36, is provided to prevent over-reach of the armature and also to prevent induced spin of the ratchet wheel 38. A back limit stop 40 prevents engagement by the pawl 37 of more than one tooth at a time of the ratchet wheel 38. The position of the back stop 40 can be adjusted by means of adjusting the position of the bolt 56 in the slot 55 of the limit stop 40. Back-lash spring 41 prevents backward movement of the ratchet wheel 38 which might otherwise occur through backward drag as the pawl 37 moves to the left (in FIGURE 2) to engage another tooth. An adjusting screw 42 adjusts the position of the back-lash spring 41.

Input leads 45 are connected to an external electrical power supply and to suitable terminals in a terminal board 50. Two leads 64 connected to input leads 45 are directly attached to the electric motor 32 thereby supplying power for the gear train and traction drum. Two other leads 44 are also connected to the leads 45 and to a transformer 33. One of the leads 44 passes through a fuse (not shown) in the fuse cage 43 so as to provide overload protection for the transformer. The transformer output is preferably connected by leads 46 to a rectifier 34 which supplies D.C. voltage to the relay coil 35. The circuit through the rectifier 34 and the coil 35 is connected to an external switch by the leads 47. Capacitors 48 and 49, connected across the rectifier and across the external switch as shown, tend to prevent burning of the contacts in the external switch.

It can thus be seen that when the external switch connected to leads 47 is closed, current will flow through the coil 35, thereby causing armature 36 to move to the right. This motion is transferred to the ratchet wheel 38 by means of the pawl 37, thereby causing the ratchet wheel 38 to move clockwise by a fixed amount. The rotational motion of the ratchet wheel 38 is transmitted through shaft 61 to cam 17, thereby causing the pen holder 13 to move transversely with respect to the direction of motion of the tape by a fixed amount. The transverse motion of the pen holder appears as a step on the ink trace made by the pen 16 on the moving tape. An impulse input is recorded on the tape as a step output.

If, for example, the leads 47 are connected to a mercury switch which is actuated by the tipping of a standard tipping bucket collecting rainfall, the resulting step in the ink trace indicates that the tipping bucket has tipped. Since the tipping bucket tips after collecting a predetermined quantity of water, the total number of steps on the ink trace give an indication of the quantity of rainfall. It will be understood that the bucket empties when tipped. The number of steps for unit time gives an indication of the intensity of rainfall, and the total length of time over which a series of steps occurs indicates the duration of the particular rain shower measured.

Since the drive motor 32 is a constant speed motor, the traction drum 4 rotates at a constant rate. The timing mechanism generally indicated as 62 causes a mark to be made on the tape at a fixed point on the drum once for every complete revolution of the traction drum 4. Thus, a series of time reference marks appear on the tape. The gear ratios in the gear train between the electric motor 32 and the traction drum 4 are preferably chosen so that a complete revolution of the traction drum occurs in some convenient length of time, such as one hour or one day. The distance between two successive marks made on the tape by the time recording mechanism 62 thus indicates a length of time corresponding to the period of revolution of the drum.

The time recording mechanism 62 includes a paper punching index pin 26 which is adjustably mounted on the lever arm 25. The lever arm 25 is fixedly connected to a bearing sleeve 23 which is attached to or integral with a trigger arm 20. The trigger arm 20 is pivotally mounted about the supporting pin 24 mounted on and projecting from base plate 1. One end 65 of the trigger arm 20 engages two springs 28 and 21 as shown. The other projecting end 63 of the trigger arm 20 is adapted to be engaged by a stud 29 fixedly secured to the flange of the traction drum 4. The rest position of the trigger arm 20 is shown in solid lines in FIGURE 3. As the traction drum rotates in the direction of the arrow 66 shown in FIGURE 3, the trigger arm 20 is forced to move into the position shown in broken lines in this figure. This causes compression of the spring 21 and extension of the spring 28. As the stud 29 moves past and out of engagement with the projecting end 63 of the trigger arm 20, the springs 21 and 28 force the trigger arm 20 back to its rest position, thus bringing the index pin 26 forcibly into contact with the paper tape passing around the traction drum 4. The impact of the pin on the paper leaves a visible mark which can be used as a reference time mark. The traction drum 4 is conveniently provided with a hole 54 such that the pin 26 pierces the paper and passes through the hole 54. This gives a more easily seen reference mark and additionally saves the point of the index pin 26 from wear. The hole 54 may, if desired, be filled with a rubber insert or the like.

In operation, the recording apparatus is conveniently enclosed in a case such as case 58 shown in FIGURE 4. The front portion of the case is conveniently transparent so that an observer can ensure by visual inspection that the apparatus is functioning properly.

It will be noted that the time reference marks produced by the index pin 26 give an accurate indication of the time at which the holes are punched regardless of slippage, expansion or contraction of the tape as it passes around the traction drum 4. Also, a series of regularly spaced studs, such as stud 29, might be used instead of a single stud on the traction drum 4. This would provide a regular series of time reference points.

The apparatus according to the invention is not restricted to the measurement of rainfall, but might be used for the measurement of other physical data by means of suitable adjustments in the gear train, motor speed, etc. The apparatus as described above is suitable only for the measurement of physical data which can be conveniently recorded in the form of steps in the ink trace produced by the recorder pen. Other methods of controlling the movement of the pen might, however, be used for other purposes.

What I claim as my invention is:

1. Graphic recording apparatus for recording a signal on paper tape and the like, comprising a rotatable traction drum, means for rotating the drum at a constant speed, a take-off spool adapted to hold a roll of tape, a take-up spool mounted to receive tape from the roll after said tape has passed around the drum, means causing the tape frictionally to engage the drum as it passes thereover whereby said drum moves the tape from the take-off spool to the take-up spool, an arm having a first end extending over the tape and a second end pivotally mounted on a support to permit said first end to move back and forth transversely of the tape, a scribing instrument carried by said first end of the arm and engaging the tape to draw a continuous line thereon during movement thereof, rotatable shifting means connected to the arm between said ends thereof and spaced from said second end and adapted to move the arm to shift the scribing instrument back and forth across the tape, and means connected to the shifting means for intermittently rotating the latter in response to external signals to produce step-like oscillations in the line drawn on the tape.

2. Graphic recording appartaus as claimed in claim 1 in which the rotatable shifting means comprises a rotatable cam having an endless reversing groove therein, said arm having a stud projecting therefrom and riding in said groove.

3. Graphic recording apparatus as claimed in claim 2 in which the means for intermittently rotating the cam comprises a ratchet wheel fixed to the cam and a pawl responsive to flow of current through a relay coil to rotate the ratchet wheel through a predetermined angle of rotation in response to input impulse signals thereby to cause the cam to rotate through said predetermined angle in response to each impulse signal.

4. Graphic recording apparatus as claimed in claim 1 including means for guiding the tape on to the drum and maintaining said tape under tension, comprising a spring-loaded brake and guide resiliently pressing against the tape roll on the take-off spool and having means for retaining said roll in alignment with the drum.

5. Graphic recording apparatus as claimed in claim 1 including time recording means periodically operated by the drum during rotation of said drum and adapted to make time reference marks on the tape at predetermined time intervals.

6. Graphic recording apparatus as claimed in claim 5 wherein the time recording means is a spring-actuated paper punching pin adapted to visibly mark the tape, said rotatable drum including actuating means adapted to actuate said pin when the drum is in a predetermined position.

7. Graphic recording apparatus for recording a signal on paper tape and the like, comprising a support having front and rear sides, a shaft extending through the support, power means mounted on the rear side of the support connected to the shaft to rotate said shaft at a constant speed, a drum mounted on the shaft for rotation therewith at the front side of the support, a take-off spool rotatably mounted on and projecting from the front side of the support to hold a roll of tape, said take-off spool being spaced from and extending substantially parallel with the shaft, a take-up spool rotatably mounted on and projecting from the support front side spaced from the take-off spool and the shaft to receive tape from the roll after said tape has passed around the drums, means causing the tape frictionally to engage the drum as it passes thereover whereby said drum moves the tape from the take-off spool to the take-up spool, an arm extending along the front side of the support and having a first end extending over the tape and a second end pivotally mounted on a bearing post projecting from said support to permit said first end to move back and forth transversely of the tape, a scribing instrument carried by said first end of the arm and engaging the tape to draw a continuous line thereon during movement thereof, a cam mounted on a shaft journalled in the support and extending substantially parallel to the drum axis and transversely of the arm, said cam having an endless reversing groove therein, a stud projecting from the arm and riding in said groove to move the arm to shift the scribing instrument back and forth across the tape, and means on the rear side of the support connected to said shaft of the cam for intermittently rotating the latter in response to the external signals to produce step-like oscillations in the line drawn on the tape.

8. Graphic recording apparatus as claimed in claim 7 including means on the front side of the support periodically operated by the drum during rotation thereof for marking the tape once for every predetermined angle of rotation of said drum.

9. Graphic recording apparatus as claimed in claim 8 in which the tape marking means comprises a pin swingably mounted on the front side of the support and extending towards the drum, means normally maintaining the pin spaced from the drum, and means on the drum to cause the pin at regular intervals to move towards the drum to mark the tape extending over said drum.

References Cited by the Examiner
UNITED STATES PATENTS

| | | | |
|---|---|---|---|
| 237,753 | 2/81 | Kettell | 346—34 |
| 835,901 | 11/06 | Collett | 346—93 |
| 1,091,804 | 3/14 | Burch | 346—93 |
| 1,183,969 | 5/16 | Gransbury | 346—62 |
| 2,754,170 | 7/56 | Felton | 346—139 |
| 2,947,593 | 8/60 | Davey | 346—117 |

LEYLAND M. MARTIN, *Primary Examiner.*

G. Y. CUSTER, *Examiner.*

UNITED STATES PATENT OFFICE
CERTIFICATE OF CORRECTION

Patent No. 3,162,504                          December 22, 1964

Cecil E. J. Pecknold

It is hereby certified that error appears in the above numbered patent requiring correction and that the said Letters Patent should read as corrected below.

In the grant, lines 2 to 4, for "assignor to Greater Vancouver Sewerage and Drainage District, of Vancouver, British Columbia, Canada, a body corporate of British Columbia," read -- assignor of fifty percent to Greater Vancouver Sewerage and Drainage District, of Vancouver, British Columbia, Canada, a body corporate of British Columbia, --; lines 13 and 14, for "Greater Vancouver Sewerage and Drainage District, its successors" read -- Cecil E. J. Pecknold, his heirs or assigns and Greater Vancouver Sewerage and Drainage District, its successors --; in the heading to the printed specification, lines 4 to 6, for "assignor to Greater Vancouver Sewerage and Drainage District, Vancouver, British Columbia, Canada, a body corporate of British Columbia" read -- assignor of fifty percent to Greater Vancouver Sewerage and Drainage District, Vancouver, British Columbia, Canada, a body corporate of British Columbia --.

Signed and sealed this 22nd day of June 1965.

(SEAL)
Attest:

ERNEST W. SWIDER                      EDWARD J. BRENNER
Attesting Officer                   Commissioner of Patents